US005961092A

United States Patent [19]
Coffield

[11] Patent Number: 5,961,092
[45] Date of Patent: Oct. 5, 1999

[54] VEHICLE WITH A SATELLITE DISH MOUNTING MECHANISM FOR DEPLOYABLY MOUNTING A SATELLITE DISH TO THE VEHICLE AND METHOD FOR DEPLOYABLY MOUNTING A SATELLITE DISH TO A VEHICLE

[75] Inventor: Franklin R. Coffield, Athens, Ala.

[73] Assignee: Satellite Mobile Systems, Inc., Athens, Ala.

[21] Appl. No.: 08/919,331

[22] Filed: Aug. 28, 1997

[51] Int. Cl.$^6$ .................................................... A01K 97/10
[52] U.S. Cl. ....................... 248/539; 248/540; 248/230.1; 343/713; 342/359; 52/110
[58] Field of Search ........................... 248/295.11, 125.5, 248/125.8, 188.5, 447.1, 447.2, 449, 230.1, 460, 688, 539, 689, 540, 354, 154, 541; 343/880, 883, 889, 890, 878, 882, 896, 715, 713, 714, 892, DIG. 2; 348/723, 722; 52/111, 112, 110, 118; 342/359

[56] References Cited

U.S. PATENT DOCUMENTS

| | | | |
|---|---|---|---|
| 2,212,561 | 8/1940 | Frischeisen | 343/715 |
| 2,259,628 | 10/1941 | Fener et al. | 348/805 |
| 2,473,981 | 6/1949 | Wood | 343/721 |
| 2,538,885 | 1/1951 | Schumann, Jr. | 52/110 |
| 2,632,850 | 3/1953 | Anderson | 52/110 |
| 3,286,265 | 11/1966 | Clemence et al. | 343/761 |
| 3,412,404 | 11/1968 | Bergling | 343/762 |
| 3,979,753 | 9/1976 | Underwood | 343/706 |
| 4,309,708 | 1/1982 | Sayovitz | 343/713 |
| 4,596,484 | 6/1986 | Nakatani | 403/104 |
| 4,663,633 | 5/1987 | Wilson | 343/714 |
| 4,725,843 | 2/1988 | Suzuki et al. | 342/359 |
| 4,748,451 | 5/1988 | Edwards | 343/880 |
| 4,796,032 | 1/1989 | Sakurai et al. | 342/359 |
| 4,856,838 | 8/1989 | Reshke et al. | 296/14 |
| 4,918,460 | 4/1990 | Collins et al. | 343/877 |
| 5,061,936 | 10/1991 | Suzuki | 342/359 |
| 5,101,215 | 3/1992 | Creaser, Jr. | 343/883 |
| 5,414,435 | 5/1995 | Wolf | 343/713 |
| 5,522,300 | 6/1996 | Cheatwood | 84/453 |
| 5,526,010 | 6/1996 | Plunk | 343/882 |
| 5,561,433 | 10/1996 | Chaney et al. | 342/359 |
| 5,568,205 | 10/1996 | Hurwitz | 348/723 |
| 5,576,722 | 11/1996 | Bustillos | 343/882 |
| 5,615,856 | 4/1997 | Simington | 248/452 |

OTHER PUBLICATIONS

Datron, DBS–4000 advertising brochure, date unknown.
Datron, DBS–3000 and DBS–4000 advertising brochure, date unknown.
Datron, DBS–3000 advertising brochure, date unknown.
Winegard, advertising brochure, 1996.

*Primary Examiner*—Derek J. Berger
*Assistant Examiner*—Tan Le
*Attorney, Agent, or Firm*—Pillsbury Madison & Sutro LLP

[57] ABSTRACT

A telescopic mast is provided for deployably mounting a satellite dish to a vehicle. The telescopic mast preferably is secured to a rear surface of a truck cab or other vehicle. The satellite dish is deployable via extension of the telescopic mast. The telescopic mast includes a base tube secured to the back of the vehicle and a shaft telescopically mounted within the base tube. The shaft has a dish carrier portion adapted to carry the satellite dish. The shaft is telescopically movable between a first position wherein the dish carrier portion is higher than a roof of the vehicle, and a second position wherein the dish carrier portion is lower than the roof of the vehicle to thereby protect the dish carrier portion from exposure to wind generated by movement of the vehicle to protect the dish carrier portion from road debris. A releasable locking device selectively prevents telescopic extension and retraction of the shaft with respect to the base tube. A rotational lock is connected to the base tube for releasably preventing rotation of the base tube. The rotational lock is releasable to permit rotation of the base tube and thereby permit rotational alignment of the dish carrier portion with a desired satellite signal.

24 Claims, 6 Drawing Sheets

VEHICLE WITH A SATELLITE DISH MOUNTING MECHANISM FOR DEPLOYABLY MOUNTING A SATELLITE DISH TO THE VEHICLE AND METHOD FOR DEPLOYABLY MOUNTING A SATELLITE DISH TO A VEHICLE

BACKGROUND OF THE INVENTION

The present invention relates to a telescopic mast for deployably mounting a satellite dish to a vehicle, and more particularly, to a telescopic mast capable of mounting a satellite dish to a rear surface of a truck cab or other vehicle, the satellite dish being deployable via extension of the telescopic mast.

There are at least three commercially available mechanisms for mounting satellite dishes to vehicles. One such mechanism is commercialized by Winegard, Inc. of Burlington, Iowa (hereinafter the "Wingard mechanism"). The Winegard mechanism includes a mounting assembly for removably mounting a satellite dish to the side of a truck cab, or to a hand rail or ladder rail which is fixed to the side of the truck cab. The Winegard mechanism, however, requires removal of the satellite dish before the truck can be used for highway travel. Such removal is necessary because otherwise the satellite dish would be exposed to road wind and direct impact from road debris. The effects of road wind and the potential for damage by road debris impact are especially problematic at the sides of the truck. The resulting need for removal of the satellite dish prior to travel is inconvenient for the driver, especially during inclement weather. Another disadvantage associated with the Winegard mechanism is the need for storage space in the cab for the satellite dish during travel. This disadvantageously wastes space in the cab. The Winegard mechanism therefore provides a less than optimal arrangement.

The second commercially available mechanism for mounting a satellite dish to a vehicle has been commercialized by Datron, a division of Transco, Inc. which is based in Simi Valley, Calif. The second mechanism was commercialized using the trademark "DBS-3000". Datron's "DBS-3000" is mounted to the top of a vehicle. The device provides an automatic alignment mechanism which automatically aligns the satellite dish with the desired satellite signal. Because the "DBS-3000" remains mounted to the top of the vehicle during travel, a special collapsible satellite dish is required to avoid wind damage. In addition, the "DBS-3000" requires a deployment mechanism capable of deploying the satellite dish from its collapsed configuration in response to remote actuation of the deployment mechanism. Otherwise, the driver of the vehicle would have to climb on the roof of the vehicle in order to deploy the satellite dish. In addition, installation and maintenance of the Datron unit is very difficult and complicated. The unit typically is wired to the master electrical system of the truck whereby the unit will automatically retract when the truck brake pedal is engaged to prevent damage to the dish and unit while the truck is in transit. Very few dealers have the expertise to install this unit. Any malfunction of the unit could impact other operations of the truck and could require one of the experienced dealers to repair. The "DBS-3000" is therefore excessively complex and expensive. The cost of the "DBS-3000" makes it too expensive for acceptance by many trucking companies and truck drivers.

Datron also commercializes, using the trademark "DBS-4000", the third mechanism for mounting a satellite dish to a vehicle. Datron's "DBS-4000" is also mounted to the roof of a vehicle. The "DBS-4000" provides a complex mechanism for aligning the satellite dish with the desired satellite signal. The "DBS-4000" also uses a special satellite dish contained in a "RADOME" cover to decrease wind resistance. The resulting combination of features is complex and therefore very expensive, thereby taking the "DBS-4000" out of the financial reach of many trucking companies and truck drivers.

SUMMARY OF THE INVENTION

It is a primary object of the present invention to overcome the aforementioned deficiencies in the commercially available mounting mechanisms, by providing an affordable and uncomplicated mechanism for deployably mounting a satellite dish to a vehicle.

Another object of the present invention is to provide a mechanism for deployably mounting a satellite dish to the back of a vehicle such that the satellite dish remains protected from direct impact by road wind and road debris during travel and may be easily deployed to a height which permits reception of a satellite signal over the vehicle while the vehicle is stationary.

Yet another object of the present invention is to provide a mechanism for deployably mounting a satellite dish to the back of a truck cab in such a way that the satellite dish can be manually deployed to a height above the roof of the truck while the truck is stationary, and can be manually lowered to a height below the roof of the truck cab to thereby protect the satellite dish during travel without having to remove the satellite dish from the mounting mechanism.

Still another object of the present invention is to provide a mechanism for mounting a satellite dish to the back of a truck cab in such a way that, after deployment of the satellite dish to a height above the roof of the truck, the rotational orientation of the satellite dish can be adjusted to receive a desired satellite signal by merely rotating a portion of the mounting mechanism, without having to reach above the roof of the cab.

These and other objects are achieved in accordance with the present invention by providing a mechanism for deployably mounting a satellite dish to a vehicle. This mechanism includes a base member and a movable member operatively connected to the base member. The base member is capable of being secured to the vehicle. The movable member is movable with respect to the base member and includes a dish carrier portion adapted to carry a satellite dish.

More specifically, the movable member is movable between a first position wherein the dish carrier portion is exposed to a satellite signal, and a second position wherein the dish carrier portion is protected by the vehicle from exposure to wind generated by movement of vehicle.

Preferably, the base member is defined by a base tube, and the movable member is telescopically mounted within the base tube to form a telescopic mast. At least one mounting bracket is preferably connected to the base member. The mounting bracket secures the base member rigidly to the vehicle. A spacer may be connected to the mounting bracket and arranged so as to space the base member from the vehicle.

Preferably, two such mounting brackets and spacers are provided. The first mounting bracket and its associated spacer are located toward a bottom end of the base tube. The second mounting bracket and its spacer are located toward a top end of the base tube.

A gasket is preferably located against each spacer. Each gasket is arranged so as to keep moisture out of the interface between the respective spacer and the vehicle.

The movable member preferably is defined by a hollow or solid shaft which is telescopically mounted within the base tube. The shaft is preferably hollow to accept wiring to and from the satellite dish. It is understood, however, that in view of other considerations, such as structural integrity, the shaft can be made solid.

The telescopic mounting of the shaft to the base tube is provided such that telescopic extension of the shaft from the base tube achieves the first position and retraction of the shaft into the base tube achieves the second position.

A locking device is provided for selectively preventing relative movement of the shaft with respect to the base tube after a desired amount of retraction or extension of the shaft is achieved. The locking device preferably includes a clamp fixed to the base tube, at or near the top of the base tube. The clamp is manually actuatable to engage the shaft and thereby prevent movement of the shaft with respect to the base tube.

The mechanism of the present invention is preferably mounted to the back of a vehicle. Preferably, the vehicle is a truck or the tractor of a tractor-trailer combination. Preferably, the mechanism is secured to the back of the truck's cab such that, in the first position, the dish carrier portion is higher than the roof of the truck and, in the second position, the dish carrier portion is lower than the roof of the truck cab. Thus, in the second position, the truck cab protects the dish carrier portion from exposure to wind generated by movement of the truck cab.

A rotational lock is preferably connected to the base tube for releasably preventing rotation of the base tube. The rotational lock is releasable to permit rotation of the base tube. Such rotation advantageously permits rotational alignment of the dish carrier portion with a desired satellite signal.

A mechanical stop is preferably located between the shaft and the base tube to prevent over-extension of the shaft with respect to the base tube.

Thus, a combination in accordance with the present invention includes a base tube secured to the back of a vehicle and a shaft telescopically mounted within the base tube. The shaft has a dish carrier portion adapted to carry a satellite dish. The shaft is telescopically movable between a first position wherein the dish carrier portion is higher than a roof of the vehicle, and a second position wherein the dish carrier portion is lower than the roof of the vehicle to thereby protect the dish carrier portion from exposure to wind generated by movement of the vehicle.

The combination further includes a releasable locking device for selectively preventing telescopic extension and retraction of the shaft with respect to the base tube. In addition, a rotational lock is connected to the base tube for releasably preventing rotation of the base tube. The rotational lock is releasable to permit rotation of the base tube and thereby permit rotational alignment of the dish carrier portion with a desired satellite signal.

Another combination in accordance with the present invention also includes a base tube secured to the back of the vehicle and a shaft telescopically mounted within the base tube. According to this combination, however, a satellite dish is mounted near a distal end of the shaft. The shaft is telescopically movable between a first position wherein the satellite dish is high enough to receive a desired satellite signal in an unobstructed manner, and a second position wherein the satellite dish is lower than a roof of the vehicle and is thereby protected from exposure to wind generated by movement of the vehicle.

A releasable locking device for selectively preventing telescopic extension and retraction of the shaft with respect to the base tube is also included in this combination. Likewise, a rotational lock is connected to the base tube for releasably preventing rotation of the base tube. The rotational lock is releasable to permit rotation of the base tube and thereby permits rotational alignment of the satellite dish with the desired satellite signal. After the desired alignment is achieved, the rotational lock is locked to prevent any further rotation of the satellite dish.

Other objects, features, and characteristics of the present invention as well as the methods of operation and functions of the related elements of structure, and the combination of parts and economies of manufacture, will become more readily apparent upon consideration of the following description and the appended claims with reference to the accompanying drawings, all of which form a part of this specification, wherein like reference numerals designate corresponding parts in the various figures.

DESCRIPTION OF THE PREFERRED EMBODIMENTS

Figure 1:
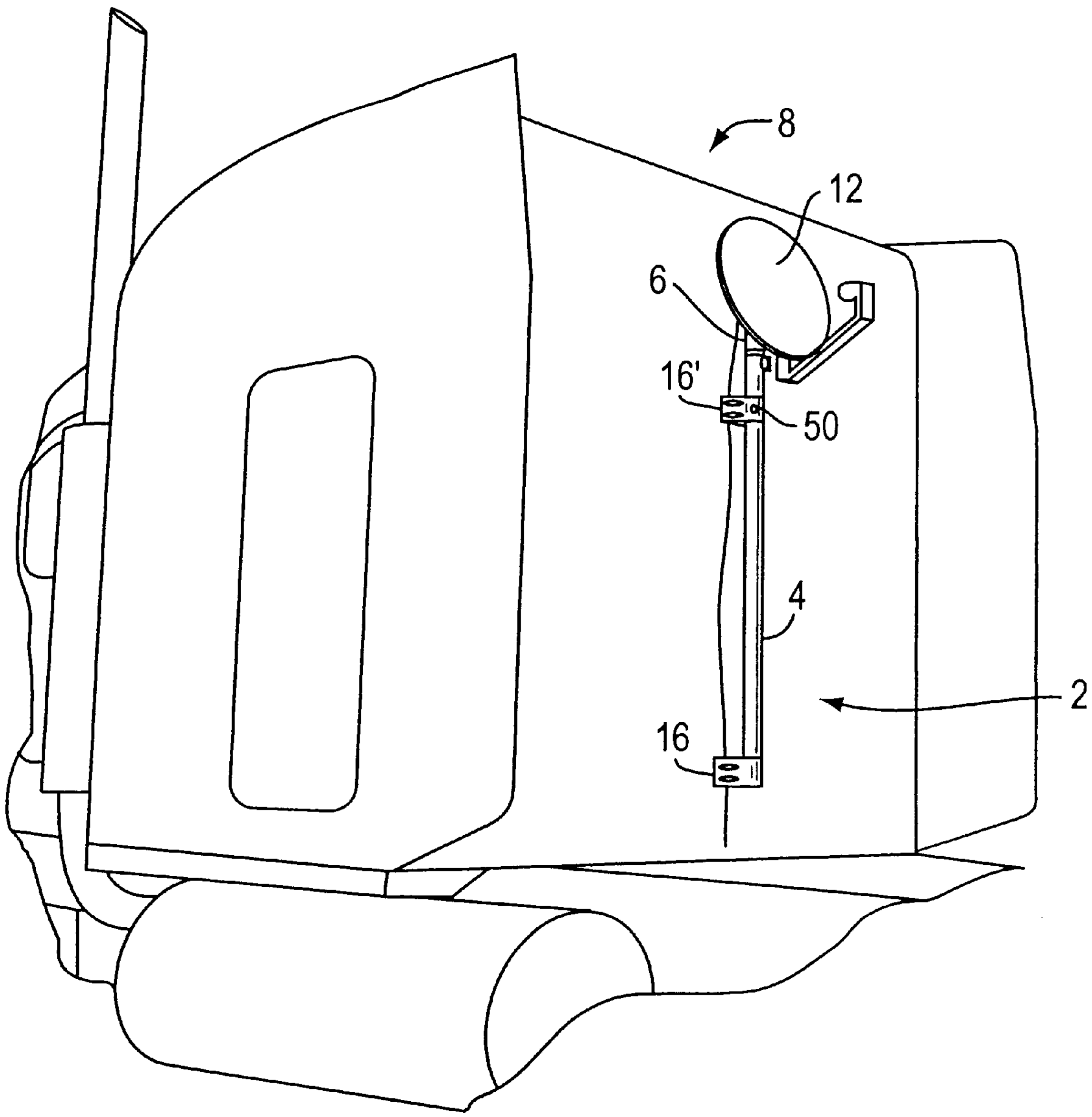
FIG. 1 is a perspective view of a mechanism for deployably mounting a satellite dish to a vehicle in accordance with a preferred embodiment of the present invention.

With reference to FIGS. 1–6, a preferred embodiment of a mechanism for deployably mounting a satellite dish to a vehicle will now be described.

The exemplary mechanism 2 includes a base member 4 and a movable member 6 operatively connected to the base member 4. The base member 4 is capable of being secured to the vehicle 8. The movable member 6 is movable with respect to the base member 4 and includes a dish carrier portion 10 adapted to carry the satellite dish 12.

More specifically, the movable member 6 is movable between a first position (illustrated in FIG. 2) wherein the dish carrier portion 10 is exposed to a satellite signal 14, and a second position (illustrated in FIG. 1) wherein the dish carrier portion 10 is protected by the vehicle 8 from exposure to wind generated by movement of vehicle 8.

Preferably, as illustrated in the drawings, the base member 4 is defined by a base tube 4, and the movable member 6 is telescopically mounted within the base tube 4 to form a telescopic mast. The base tube 4 is preferably made of aluminum tubing having a diameter of about 2 inches and a wall thickness between $\frac{1}{16}$ and $\frac{1}{8}$ of an inch.

Two mounting brackets 16,16' are connected to the base tube 4. Each mounting bracket 16,16' secures the base tube 4 rigidly to the vehicle 8.

Figure 5:
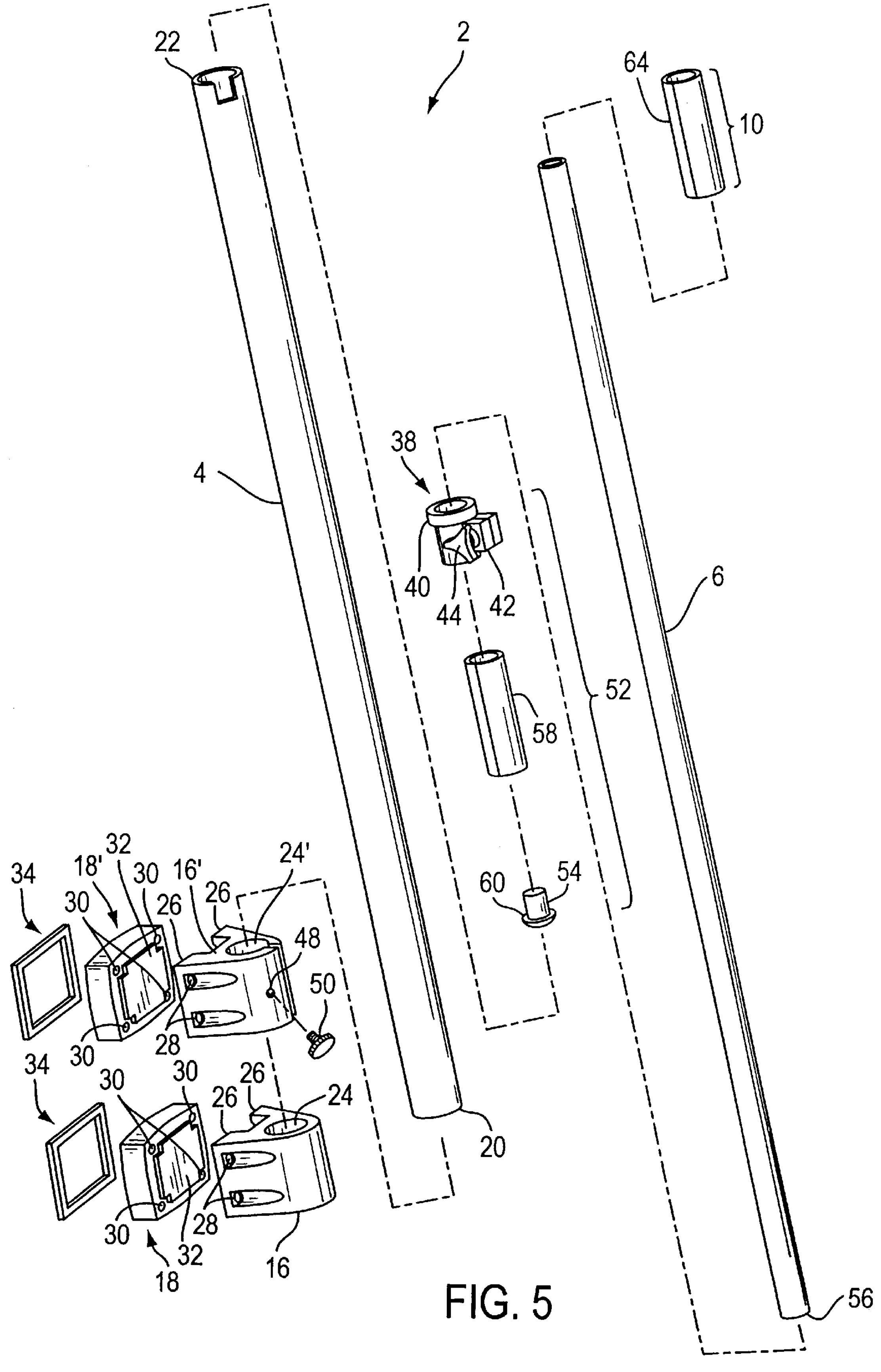
FIG. 5 is an exploded view of the mechanism illustrated in FIGS. 1–4 and further including a spacer at each bracket of the mechanism.
Figure 6:
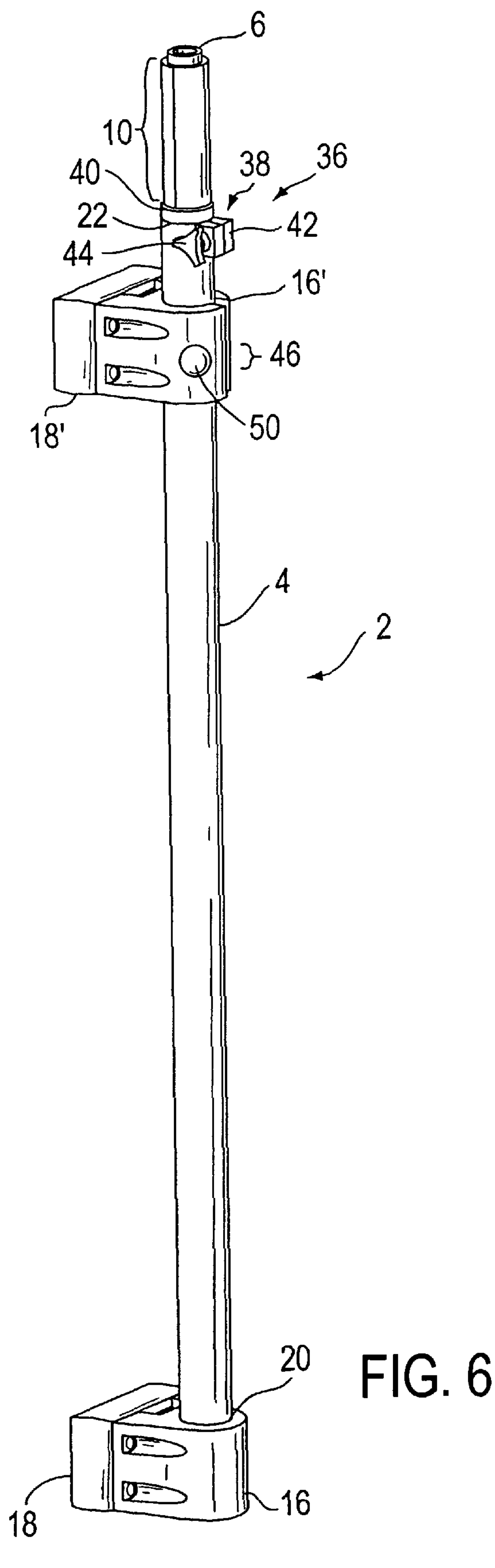
FIG. 6 is a perspective view of the mechanism illustrated in FIG. 5.

As illustrated in FIGS. 5 and 6, a spacer 18,18' may be connected to each mounting bracket 16,16' and arranged so as to space the base tube 4 from the vehicle 8. The first mounting bracket 16 and its associated spacer 18 are located toward a bottom end 20 of the base tube 4, while the second mounting bracket 16' and its associated spacer 18' are located toward a top end 22 of the base tube 4.

Each mounting bracket 16,16' has an opening 24,24' for receiving the base tube 4. In the bracket 16', the diameter of the opening 24' is at least as large as the outer diameter of the base tube 4. The mounting bracket 16' therefore allows the base tube 4 to pass completely therethrough.

The opening 24 in the other mounting bracket 16, by contrast, has a smaller diameter but only near the bottom of the bracket 16. This reduced diameter portion of the opening 24 defines a shoulder against which the bottom end 20 of the base tube 4 abuts. The shoulder thus provides support for the base tube 4 and prevents the bottom end 20 of the base tube 4 from extending below the bottom bracket 16.

It is understood that a similar arrangement can be provided by closing the bottom of the opening 24 in the bracket 16. In this regard, the shoulder can be replaced by a closed bottom of a cup-shaped opening 24.

Each bracket 16,16' preferably has support legs 26 which engage the vehicle 8 or the spacers 18,18'. Fastener holes 28 are provided in the legs 26. The fastener holes 28 receive fasteners (not shown), such as bolts, screws, and the like, which secure the brackets 16,16' to the vehicle 8, preferably via the spacers 18,18'.

The spacers 18,18' also include fastener holes 30 and a raised center portion 32. The raised center portion 32 has an outline which matches a footprint of the support legs 26. The raised center portion 32 and the footprint of the support legs 26 cooperate to facilitate proper alignment of the brackets 16,16' with the spacers 18,18' and alignment of the fastener holes 30 with the fastener holes 28.

Preferably, the spacers 18,18' are generally hollow and open toward the vehicle 8. The side of the spacers 18,18' directed toward the vehicle 8 has a generally rectangular foot print matching the outline of the spacer 18,18'. Thus, only the periphery of each spacer 18,18' bears against the vehicle 8.

A gasket 34 is preferably located against each spacer 18,18' on the side of the spacer 18,18' which faces the vehicle 8. Each gasket 34 is arranged so as to keep moisture out of the interface between the spacer 18,18' and the vehicle 8. Preferably, each gasket 34 has a groove which receives the periphery of the respective spacer 18,18'.

When the spacers 18,18' are not used, it is understood that an appropriately shaped gasket (not shown) may be provided between the support legs 26 and the vehicle 8.

The movable member 6 preferably is defined by a hollow or solid shaft 6 which is telescopically mounted within the base tube 4. The shaft 6 is preferably hollow so that the wiring from the cab to the satellite dish can be fed through the interior of the shaft 6 and the interior of the base tube 4. A hole is preferably provided somewhere in the base tube 4 so that the wiring can exit toward the cab. It is understood, however, that in view of other considerations, such as structural integrity, the shaft 6 can be made solid.

The preferred shaft 6 is defined by a hollow aluminum tube. The shaft 6 has an outer diameter smaller than the inner diameter of the base tube 4 and a preferred wall thickness of 1/16 to 1/8 of an inch.

The telescopic mounting of the shaft 6 to the base tube 4 is provided such that telescopic extension of the shaft 6 from the base tube 4 achieves the first position (illustrated in FIG. 2) and retraction of the shaft 6 into the base tube 4 achieves the second position (illustrated in FIG. 1).

A locking device 36 is provided for selectively preventing relative movement of the shaft 6 with respect to the base tube 4 after a desired amount of retraction or extension of the shaft 6 is achieved. The locking device 36 preferably includes a clamp 38 rigidly fixed to the base tube 4, at or near the top 22 of the base tube 4. The clamp 38 is manually actuatable to engage the shaft 6 and thereby prevent movement of the shaft 6 with respect to the base tube 4.

In particular, the clamp 38 is defined by a split ring 40 which circumferentially surrounds the shaft 6. The split ring 40 includes radially outwardly extending tabs 42 at opposites sides of a split in the ring 40. A threaded knob 44 is arranged so that rotation of the knob 44 in one direction draws the tabs 42 closer together, and rotation in an opposite direction draws the tabs 42 farther apart. Drawing the tabs 42 closer together in this manner reduces the diameter of the split ring and causes the split ring 40 to frictionally engage the shaft 6. Movement of the shaft 6 with respect to the base tube 4 is thereby prevented.

When extension or retraction of the shaft 6 is desired, the knob 44 is rotated in an opposite direction. Such rotation of the knob 44 draws the tabs 42 farther apart, thereby increasing the diameter of the split ring 40 and permitting extension or retraction of the shaft 6.

Preferably, the knob 44 has a generally triangular hand grip portion which facilitates manual gripping of the knob 44, and an outwardly threaded bolt portion. The bolt portion preferably passes through the tab 42 adjacent to the hand grip portion, and threadedly engages the other tab 42, or alternatively, threadedly engages a nut secured to the other tab 42 in a nonrotatable manner.

Figure 2:
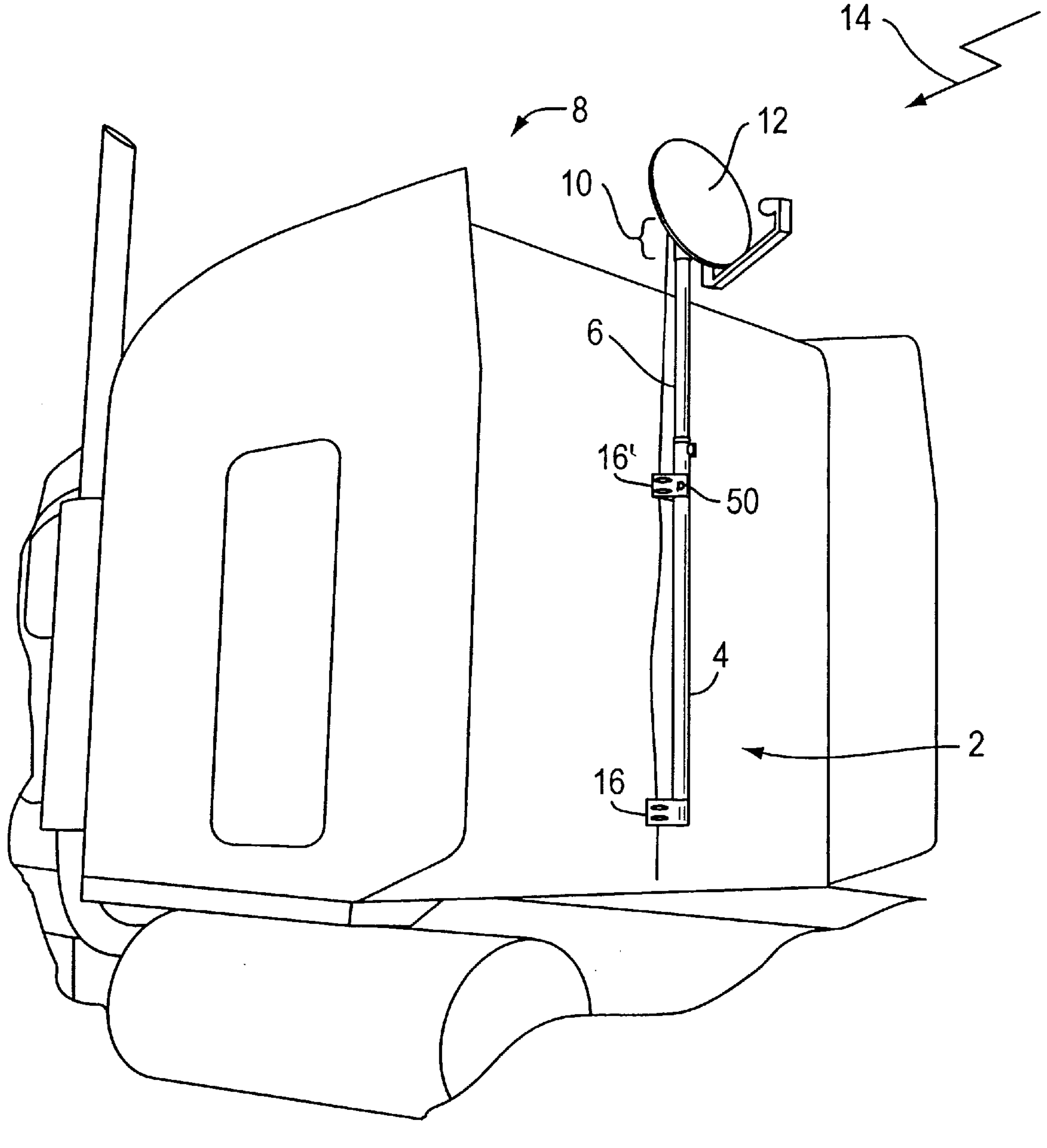
FIG. 2 illustrates the mechanism of FIG. 1 after deployment of he satellite dish.

The mechanism of the present invention is preferably mounted to the back of the vehicle 8. As illustrated in the drawings, the vehicle 8 may be a truck or the tractor of a tractor-trailer combination. Preferably, as illustrated in FIGS. 1 and 2, the mechanism 2 is secured to the back of the truck's cab such that, in the first position, the dish carrier portion 10 is higher than the roof of the truck and, in the second position, the dish carrier portion 10 is lower than the roof of the truck cab. Thus, in the second position, the truck cab protects the dish carrier portion 10 from exposure to wind generated by movement of the truck cab.

Preferably, the base tube 4 has a length of between four and five feet and the shaft is longer than the base tube 4 by about six to twelve inches. Such lengths permit the mounting mechanism 2 to be secured to the back of the truck's cab, as illustrated in FIGS. 1 and 2, at a height where the mechanism 2 can be reached easily to deploy the satellite dish 12, while permitting deployment of the satellite dish 12 to a height where neither the cab nor the trailer obstructs the satellite signal 14. Advantageously, deployment of the satellite dish 12 to such a height can be accomplished using the illustrated arrangement, without having to reach above the roof of the cab and without the need for an automated deployment mechanism.

A rotational lock 46 is preferably connected to the base tube 4 to releasably prevent rotation of the base tube 4. When the rotational lock 46 is released, rotation of the base tube 4 becomes possible. Such rotation advantageously permits rotational alignment of the dish carrier portion 10 with the desired satellite signal 14 after the satellite dish 12 has been deployed to an appropriate height.

The rotational lock 46 is preferably defined by the combination of a threaded hole 48 in the top mounting bracket 16' and a bolt 50 which is threadedly received in the opening 48. The bolt 50 is long enough to engage the base tube 4 and to thereby prevent rotation of the base tube 4 with respect to the top bracket 16'. Preferably, the bolt 50 has a large head which is knurled to facilitate manual tightening of the bolt 50 against the base tube 4.

Figure 3:
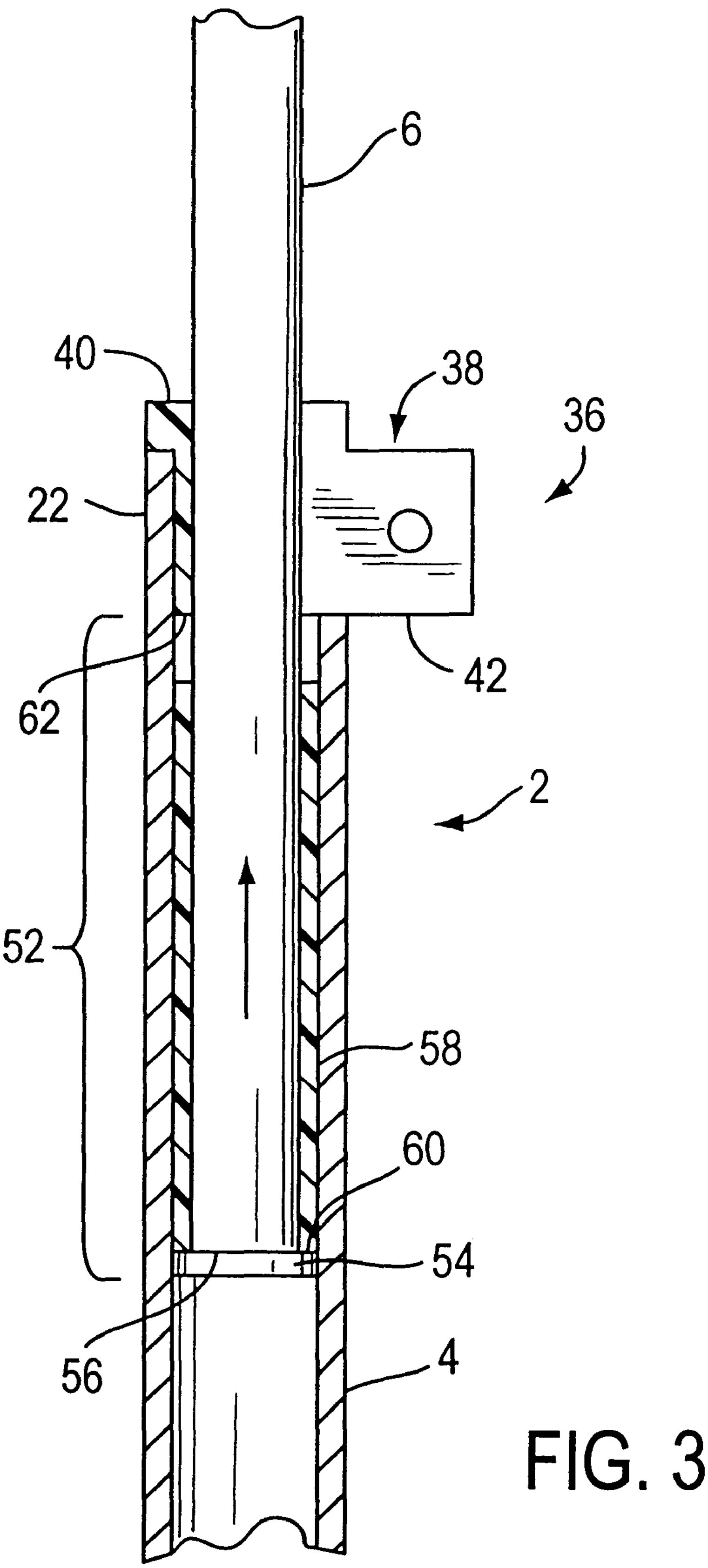
FIG. 3 is a sectional view of the mechanism illustrated in FIGS. 1 and 2, showing the interconnection between a base tube and an extendible shaft of the mechanism.

As illustrated in FIGS. 3 and 5, a mechanical stop 52 is preferably located between the shaft 6 and the base tube 4 to prevent over-extension of the shaft 6 with respect to the base tube 4. Preferably, the mechanical stop 52 is defined by the combination of an end cap 54 fixed to the bottom end 56 of the shaft 6, a split tube 58 bearing against a base 60 of the end cap's head, and a bottom surface 62 of the split ring 40. As the shaft 6 is extended, the base 60 of the end cap's head moves upwardly inside the base tube 4. At the desired maximum extension, the top of the split tube 58 strikes the bottom surface 62 of the split ring 40. Further advancement of the shaft 6 is therefore prevented.

The split tube 58 has a length of between five and eight inches (preferably six inches) and therefore keeps at least that much of the shaft's length inside the base tube 4. A stable maximum extension of the shaft 6 is thereby provided when the top of the split tube 58 reaches the bottom surface 62 of the split ring 40.

Since most conventional satellite dishes have clamping brackets for clamping the conventional dish to a rod in a mounting assembly, the dish carrier portion 10 of the shaft 6 may be provided with an outside diameter which matches that of the rod in the conventional mounting assemblies. Conventional satellite dishes thus can be mounted directly to the shaft 6.

Figure 4:
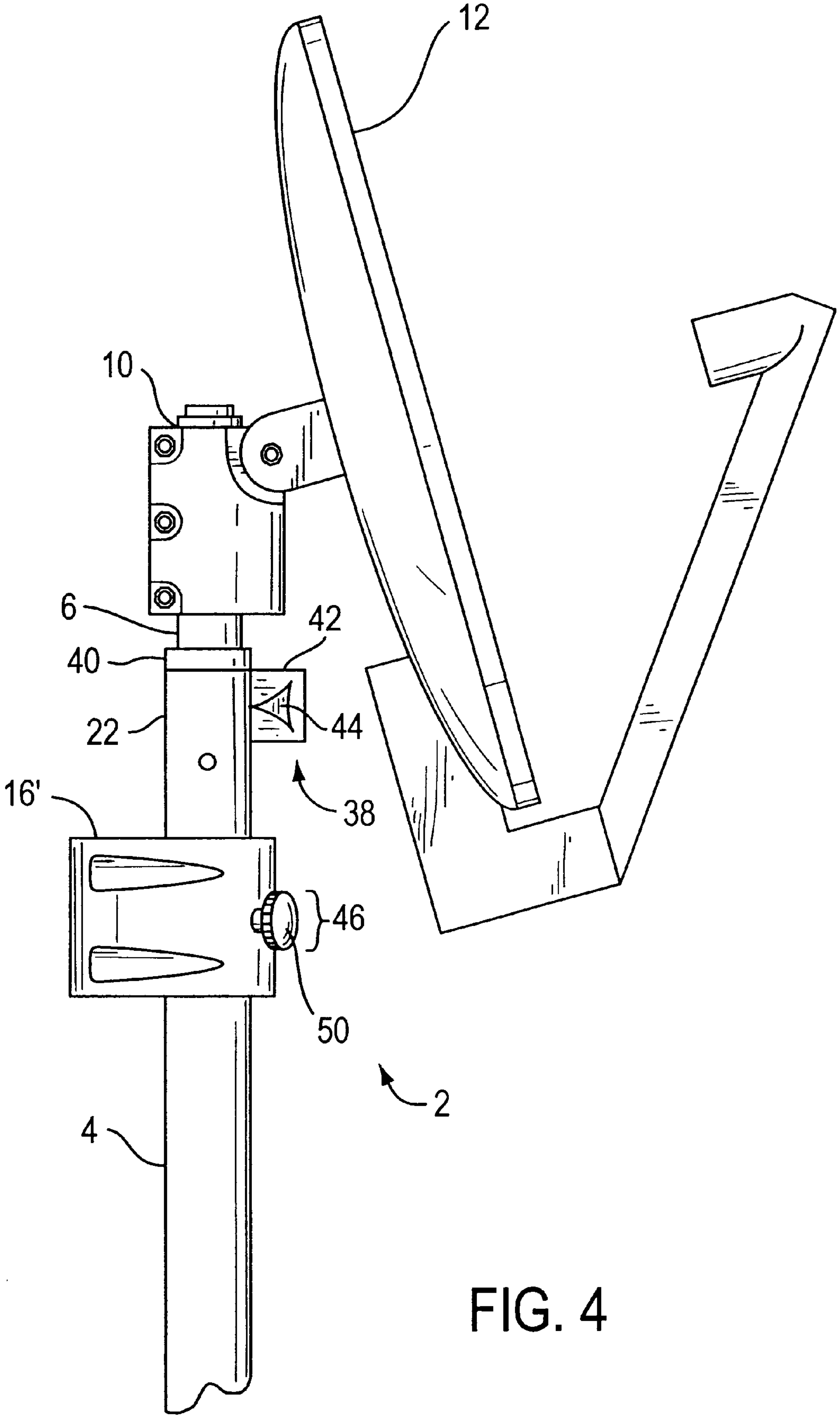
FIG. 4 is a side view of the mechanism illustrated in FIGS. 1–3, showing the top of the mechanism when the extendible shaft is retracted.

Alternatively, a thinner shaft 6 may be provided along with a split adapter tube 64 which fits snugly around the shaft 6 to define a dish carrier portion 10 having an outer diameter which is compatible with existing satellite dish mounting clamps. As illustrated in FIG. 4, the mounting clamp of the satellite dish 12 is clamped about the dish carrier portion 10.

In the preferred embodiment illustrated in the drawings, the brackets 16,16' and spacers 18,18 are made of aluminum; the split ring 40, end cap 54, split tube 58 and split adapter tube 64 are made of made of plastic, PVC, or the like; and the gaskets 34 are made of rubber.

A preferred manner of assembling the illustrated mounting mechanism 2 will now be described.

The split tube 58 is placed around the bottom of the shaft 6 and the end cap 54 is secured to the bottom of the shaft 6. The end cap 54 may be secured in place using adhesive, a snap-fitting, a threaded connection or the like.

The clamp 38 is secured to the top end 22 of the base tube 4 so that the tabs 42 project radially out through a slot in the top end 22 of the base tube 4. The walls of the slot prevent relative rotation of the clamp 38 with respect to the base tube 4. Despite the presence of the walls of the slot, the clamp 38 may be further secured in place using adhesive, a snap-fitting, a threaded connection or the like.

Holes may be drilled in the back of the truck cab at locations corresponding to the positions of fastener holes 28 and 30 of the brackets 16,16' and spacers 18,18'.

The gaskets 34 are attached to the sides of the spacers 18,18' which face the truck cab. The spacers 18,18' and brackets 16,16' are secured in place using fasteners. When the fasteners constitute, for example, bolts, such bolts are passed through the holes 28 and 30 and into the cab of the truck via the holes which were previously drilled in the back of the cab. A nut is threaded tightly onto each bolt from inside the cab. The brackets 16,16' and spacers 18,18' are thereby secured to the back of the truck cab.

The top of the shaft 6 is inserted into the bottom of the base tube 4 and is advanced through the base tube 4 until it extends out from the top 22 of the base tube 4. The shaft 6 may be locked to the base tube 4 by tightening the knob 44 of the clamp 38.

The combined shaft 6 and base tube 4 are inserted, bottom-end-first, through the top of the bracket 16. Both are advanced through the bracket 16 until the base tube 4 enters the bottom bracket 16' and engages the shoulder at the bottom of the hole 24 in the bottom bracket 16'.

The bolt 50 is threaded into the hole 48 until it engages the base tube 4 and thereby secures the base tube 4 in place.

If the split adapter tube 64 is to be utilized, it is secured around the top end of the shaft 6. The satellite dish 12 is clamped to the mounting mechanism 2 via the split adapter tube 64 and the conventional clamping assembly of the satellite dish.

The clamp 38 is loosened by appropriately turning the knob 44. After the clamp is loosened 38, the shaft 6 is manually retracted as far as the slit adapter tube 64 and/or satellite mounting clamp permit. The clamp is then tightened to secure the shaft 6 in place. The satellite dish 12 and mounting mechanism 2 are thus ready for travel. During travel, the satellite dish 12 remains protected by the cab of the truck. Road wind and debris cannot strike the satellite dish 12 directly. Although some road wind and debris may be deflected toward the back of the cab, it is understood that the force of impact associated with such deflected wind and debris would be significantly less than that of direct impact.

After arriving at a destination or rest stop, the satellite may be deployed easily without having to reach above the roof of the cab. A preferred method of deploying the satellite dish 12 will now be described.

Initially, the clamp 38 is manually loosened by appropriately turning the knob 44. After the clamp 38 is loosened, the shaft 6 is manually extended out from the base tube 4, preferably using hand-over-hand advancement of the shaft 6. Upon achieving the maximum height, as determined by the mechanical stop 52, or alternatively, upon achieving any desired height between the retracted position and the maximum height, the clamp 38 can be manually tightened to secure the shaft 6 in place with respect to the base tube 4.

Next, the bolt 50 is loosened. Loosening of the bolt 50 permits rotation of the base tube 4. Since the clamp 38 remains tightened against the shaft 6, the shaft 6 rotates along with any rotation of the base tube 4. Such rotation of the base tube 4 is manually performed until the satellite dish 12 becomes aligned with the desired satellite signal 14. The bolt 50 is tightened upon achieving alignment with the desired satellite signal 14.

When it is time to travel again, the bolt 50 is loosened and the base tube 4 is rotated so that the satellite dish 12 clears the roof of the cab as it is lowered. The bolt 50 is then tightened, and the clamp 38 is loosened. After the clamp 38 is loosened, the shaft 6 is fully retracted, or is at least retracted until the satellite dish is lower than the roof of the truck cab. The clamp 38 is then tightened to secure the shaft 6 to the base tube 4 for travel.

Although two brackets 16,16' are shown in the preferred embodiment, it is understood that, by providing appropriate strength of materials, the two brackets 16,16' may be replaced by a signal bracket. Of course, more than two brackets may also be employed.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

I claim:

1. A vehicle comprising:

a vehicle body having a top portion and a substantially vertical back surface facing generally rearwardly with respect to a forward traveling direction of said vehicle; and a satellite dish mounting mechanism attached to said back surface of said vehicle body for deployably mounting a satellite dish to the vehicle, said satellite dish mounting mechanism comprising:

a base member; and a movable member operatively connected to said base member for movement with respect to the base member in a direction parallel to a longitudinal axis of said base member, said movable member having a dish carrier portion adapted to carry a satellite dish, wherein said base member is connected to said back surface of said vehicle body so that said movable member is movable with respect to said base member and said vehicle body between a first position wherein said dish carrier portion is adapted to position the satellite dish higher than said top portion of said vehicle body so that the satellite dish is exposed to a satellite signal, and a second position wherein said dish carrier portion is adapted to position the satellite dish lower than said top portion of said vehicle body so that the satellite dish is protected by said vehicle body from exposure to wind generated by forward movement of said vehicle.

2. The vehicle of claim 1, wherein said base member comprises a base tube and said movable member is telescopically mounted within said base tube.

3. The vehicle of claim 1, said satellite dish mounting mechanism further comprising at least one bracket for securing the base member to the back surface of said vehicle body.

4. The vehicle of claim 3, said satellite dish mounting mechanism further comprising a spacer connected to each of said at least one bracket for spacing the base member from said back surface of said vehicle body.

5. The vehicle of claim 1, wherein said base member comprises a base tube and said movable member is telescopically mounted within said base tube, and said satellite dish mounting mechanism further comprises:

a first mounting bracket located toward a bottom end of the base tube, for securing the base tube to the back surface of said vehicle body; and a second mounting bracket located toward a top end of the base tube, for securing the base tube to the back surface of said vehicle body.

6. The vehicle of claim 5, said satellite dish mounting mechanism further comprising:

a first spacer connected to said first mounting bracket for spacing the base tube from the back surface of said vehicle body; and a second spacer connected to the second mounting bracket for spacing the base tube from the back surface of said vehicle body.

7. The vehicle of claim 6, said satellite dish mounting mechanism further comprising:

a first gasket located against said first spacer, and arranged between the back surface of said vehicle body and said first mounting bracket to form a seal that keeps moisture out of an interface between said first spacer and the back surface; and a second gasket located against said second spacer, and arranged between the back surface of said vehicle body and said second mounting bracket to form a seal that keeps moisture out of an interface between said second spacer and the back surface.

8. The vehicle of claim 1, wherein said base member comprises a base tube and said movable member comprises a shaft which is telescopically mounted within said base tube such that:

said first position is achievable by telescopically extending said shaft from said base tube, and said second position is achievable by retracting said shaft into the base tube.

9. The vehicle of claim 8, said satellite dish mounting mechanism further comprising a locking device for selectively preventing relative movement of the shaft with respect to the base tube.

10. The vehicle of claim 9, wherein said base tube is fixed to the back of the vehicle.

11. The vehicle of claim 9, wherein said base tube is fixed to back of a truck cab such that, in said first position, said dish carrier portion is higher than the roof of the truck cab and, in said second position, said dish carrier portion is lower than the roof of the truck cab and is thereby protected by said truck cab from exposure to wind generated by movement of said truck cab.

12. The vehicle of claim 8, said satellite dish mounting mechanism further comprising:

a first mounting bracket located toward a bottom end of the base tube, for securing the base tube to the back surface of said vehicle body; and a second mounting bracket located toward a top end of the base tube, for securing the base tube to the back surface of said vehicle body.

13. The vehicle of claim 12, wherein said first and second mounting brackets are secured to the back of the vehicle.

14. The vehicle of claim 12, wherein said first and second mounting brackets are secured to the back of a truck cab such that, in said first position, said dish carrier portion is higher than the roof of the truck cab and, in said second position, said dish carrier portion is lower than the roof of the truck cab and is thereby protected by said truck cab from exposure to wind generated by movement of said truck cab.

15. The vehicle of claim 12, said satellite dish mounting mechanism further comprising a locking device for selectively preventing relative movement of the shaft with respect to the base tube.

16. The vehicle of claim 12, said satellite dish mounting mechanism further comprising:

a rotational lock connected to the base tube for releasably preventing rotation of the base tube, said rotational lock being releasable to permit rotation of the base tube and thereby permit rotational alignment of the dish carrier portion with a desired satellite signal.

17. The vehicle of claim 8, said satellite dish mounting mechanism further comprising a mechanical stop located between the shaft and the base tube, for preventing overextension of said shaft with respect to the base tube.

18. The vehicle of claim 9, wherein said locking device comprises a clamp located toward the top of the base tube and fixed to the base tube, said clamp being manually actuatable to engage said shaft and thereby prevent movement of the shaft with respect to the base tube after a desired amount of shaft extension is achieved.

19. The vehicle of claim 1, wherein said top portion of said vehicle body comprises a roof of a passenger compartment of said vehicle body.

20. The vehicle of claim 1, wherein said back surface of said vehicle body comprises a back wall of a truck cab.

21. The vehicle of claim 1, further comprising a satellite dish carried by said dish carrier portion.

22. A vehicle comprising:

a vehicle body having a top portion and a substantially vertical back surface facing generally rearwardly with respect to a forward traveling direction of said vehicle; and a satellite dish mounting mechanism for deployably mounting a satellite dish to said back surface of said vehicle body, said satellite dish mounting mechanism comprising:

a base tube secured to the back surface of said vehicle body;

a shaft telescopically mounted within said base tube, said shaft having a dish carrier portion adapted to carry a satellite dish, said shaft being telescopically mounted within said base tube so as to be movable between a first position wherein said dish carrier portion is adapted to position the satellite dish higher than said top portion of said vehicle body, and a second position wherein said dish carrier portion is adapted to position the satellite dish lower than said top portion of the vehicle body and is thereby protected by said vehicle body from exposure to wind generated by forward movement of said vehicle;

a releasable locking device for selectively preventing telescopic extension and retraction of the shaft with respect to the base tube; and a rotational lock connected to the base tube for releasably preventing rotation of the base tube, said rotational lock being releasable to permit rotation of the base tube and thereby permit rotational alignment of the dish carrier portion with a desired satellite signal.

23. A vehicle comprising:

a vehicle body having a top portion and a substantially vertical back surface facing generally rearwardly with respect to a forward traveling direction of said vehicle; and a satellite dish mounting mechanism for deployably mounting a satellite dish to the back surface of the vehicle body, said mechanism comprising:

a base tube secured to the back surface of said vehicle body;

a shaft telescopically mounted within said base tube, said shaft having a satellite dish mounted near a distal end of the shaft, said shaft being telescopically mounted within said base tube so as to be movable between a first position wherein said mechanism is adapted to position the satellite dish high enough to receive a desired satellite signal in an unobstructed manner, and a second position wherein said mechanism is adapted to position the satellite dish lower than said top portion of the vehicle body so that the satellite dish is protected by said vehicle body from exposure to wind generated by forward movement of said vehicle;

a releasable locking device for selectively preventing telescopic extension and retraction of the shaft with respect to the base tube; and a rotational lock connected to the base tube for releasably preventing rotation of the base tube, said rotational lock being releasable to permit rotation of the base tube and thereby permit rotational alignment of the satellite dish with the desired satellite signal.

24. A method for deployably mounting a satellite dish to a vehicle, said method comprising:

attaching a base member to a substantially vertical surface of a vehicle facing generally rearwardly with respect to a forward traveling direction of the vehicle;

operatively connecting a movable member to said base member so that said movable member is movable with respect to said base member in a direction parallel to a longitudinal axis of said base member;

fixing a dish carrier portion onto said movable portion, said dish carrier portion being adapted to carry a satellite dish on said distal end of said shaft; and arranging said base member and said movable member so that said movable member is movable with respect to said base member between a first position wherein said dish carrier portion is adapted to position the satellite dish higher than a top portion of the vehicle, and a second position wherein said dish carrier portion is adapted to position the satellite dish lower than the top portion of the vehicle so that the satellite dish is protected by a portion of the vehicle from exposure to wind generated by forward movement of the vehicle.

* * * * *